United States Patent [19]

Cook

[11] Patent Number: 4,781,555

[45] Date of Patent: Nov. 1, 1988

[54] APPARATUS FOR FORMING MOLDED PATTERNS

[75] Inventor: Charles A. Cook, White Pigeon, Mich.

[73] Assignee: EFP Corp., Elkhart, Ind.

[21] Appl. No.: 991

[22] Filed: Jan. 7, 1987

[51] Int. Cl.$^4$ .................. B29C 33/40; B29C 35/04
[52] U.S. Cl. .................. 425/4 R; 249/79; 264/51; 425/412
[58] Field of Search .................. 164/45; 264/51; 425/4 R, 817 R, 412; 249/79

[56] References Cited

U.S. PATENT DOCUMENTS

| | | |
|---|---|---|
| 3,141,192 | 7/1964 | Benedetto . |
| 3,156,015 | 11/1964 | Harrison . |
| 3,193,876 | 7/1965 | Thompson .................. 264/51 X |
| 3,214,794 | 11/1965 | Otis . |
| 3,225,126 | 12/1965 | Bridges et al. .................. 264/51 |
| 3,235,908 | 2/1966 | Thompson .................. 425/4 R |
| 3,257,103 | 6/1966 | Brockhues et al. . |
| 3,264,381 | 8/1966 | Stevens . |
| 3,291,875 | 12/1966 | Freedman et al. . |
| 3,374,500 | 3/1968 | Drenning . |
| 3,424,827 | 1/1969 | Galizia et al. . |
| 3,537,131 | 11/1970 | Kracht et al. . |
| 3,556,460 | 1/1971 | Premo . |
| 3,801,244 | 4/1974 | Eisenberg . |
| 3,809,735 | 5/1974 | Cotterell .................. 264/51 |
| 3,874,830 | 4/1975 | Carter et al. .................. 425/4 R |
| 3,912,430 | 10/1975 | Noel .................. 425/4 R |
| 4,081,225 | 3/1978 | Yaita .................. 425/4 R |
| 4,190,093 | 2/1980 | Kearney et al. .................. 164/45 |
| 4,192,638 | 3/1980 | Lezier et al. .................. 264/51 X |
| 4,233,006 | 11/1980 | Panas .................. 264/51 X |
| 4,276,008 | 6/1981 | Montgomery et al. .................. 425/4 R |
| 4,298,324 | 11/1981 | Soulier .................. 264/51 X |
| 4,327,045 | 4/1982 | Nishikawa et al. .................. 264/51 |
| 4,333,897 | 6/1982 | Hayashi et al. .................. 264/51 X |
| 4,439,122 | 3/1984 | Besse et al. .................. 425/4 R |
| 4,456,443 | 6/1984 | Rabotski .................. 425/4 R |
| 4,627,946 | 12/1986 | Crabtree .................. 264/51 |

FOREIGN PATENT DOCUMENTS

| | | |
|---|---|---|
| 597175 | 5/1960 | Canada . |
| 630441 | 11/1961 | Canada . |
| 1102067 | 6/1981 | Canada . |
| 2379367 | 9/1978 | France . |
| 908475 | 2/1982 | U.S.S.R. .................. 164/45 |

Primary Examiner—Nicholas P. Godici
Assistant Examiner—J. Reed Batten, Jr.
Attorney, Agent, or Firm—Price, Heneveld, Cooper, Dewitt & Litton

[57] ABSTRACT

A mold has mold walls defining a cavity and a plurality of heated fluid inlets communicating with the cavity. An enclosed frame for storing a heated fluid is positioned about the mold. Valves are positioned completely within the enclosed frame and each of the valves is coupled to one of the heated fluid mold inlets.

8 Claims, 2 Drawing Sheets

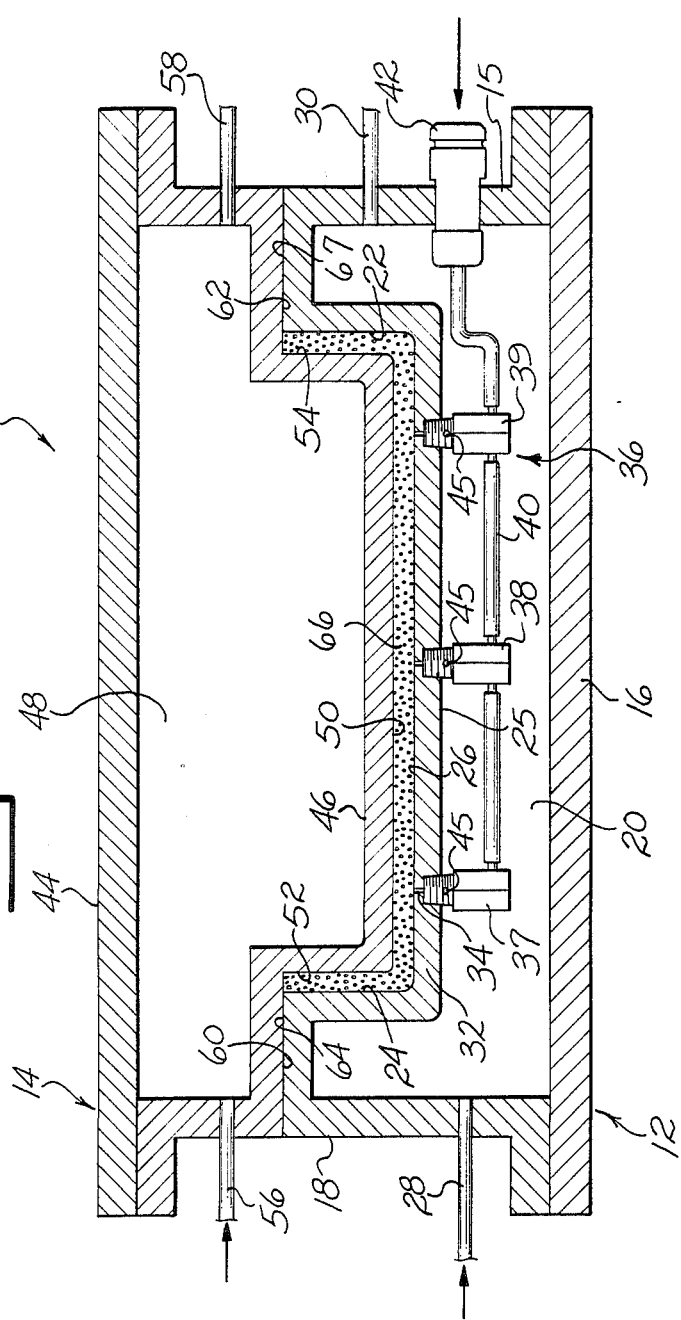

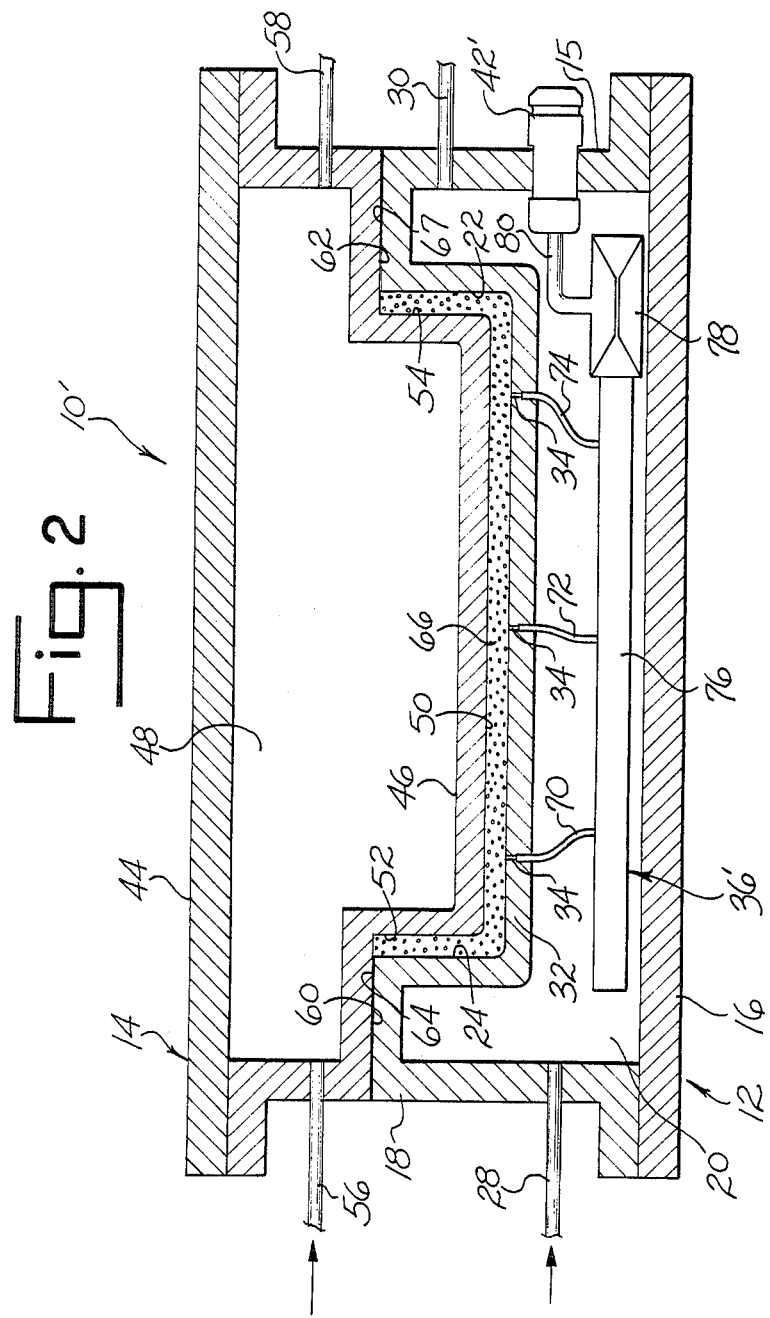

APPARATUS FOR FORMING MOLDED PATTERNS

FIELD OF THE INVENTION

This invention relates to a method of forming patterns, and will have special but not limited application to a method of molding smooth patterns from expandable plastics.

BACKGROUND OF THE INVENTION

Current procedures for casting metal articles involve the creation of master patterns which are used to form impressions in a sand mold prior to pouring in the molten metal. Cores (often formed of sand) are inserted into the sand to form the internal holes into the cast product. These procedures require that a binder intermixed with the sand in the mold to allow the sand to retain its shape during casting operations. The currently available binders are formed from chemicals which are toxic and extreme care must be experienced in disposal operations. Also, new cores must be formed for each use of the mold, a time consuming and expensive procedure.

SUMMARY OF THE INVENTION

This invention involves a process for producing master patterns out of an expandable plastic material. These patterns may be placed in a sand mold which is free of any binders or cores. As the molten metal is poured into the mold, its heat vaporizes the pattern and allows the molten metal to occupy the space in the mold previously taken up by the pattern. When the metal has solidified and cooled, the casting is removed and another pattern is placed in the sand mold as before. No cores are required since the mold sand prohibits intrusion of molten metal into intended casting openings and no binding is required to hold the sand in place.

The process involves blowing a quantity of expandable particles into a heated mold. Live steam is injected through pinholes in the mold, and is controlled by a series of valves, to insure proper fusion of the expanded particles. Due to the absence of vent holes in the mold, a smooth, accurate pattern may be formed.

Accordingly, it is an object of this invention to provide for a novel method of forming patterns from expandable plastics.

Another object of this invention is to provide for a method of forming molded patterns which are smooth and accurate in dimensions and shape.

Another object of this invention is to provide for a method of forming molded patterns which is efficient and economical.

Other objects of this invention will become apparent upon a reading of the following description.

BRIEF DESCRIPTION OF THE DRAWINGS

Two preferred embodiments of an apparatus for performing the method have been depicted as illustrative of the process wherein:

FIG. 1 is a sectional view of one embodiment of an apparatus used to produce patterns according to a method of this invention.

FIG. 2 is a sectional view of a modified apparatus used to produce the patterns.

DESCRIPTION OF THE PREFERRED EMBODIMENT

The preferred machines herein disclosed are intended to assist in illustrating the principles of the claimed method. They are not to be considered exhaustive or to limit the method to the precise forms disclosed. The preferred method is described to explain the principles thereof, so as to allow others skilled in the art to practice the method.

The preferred method of this invention may be best understood by the following description of the apparatus generally designated by the numeral 10 in FIG. 1 or the modified apparatus 10' in FIG. 2. With regard to FIG. 1, apparatus 10 includes two steam chests 12 and 14. Steam chest 12 includes an outer frame plate 16 and an inner frame 18 which may be shaped as shown in FIG. 1 to form a closed steam reservoir 20. The surfaces 22, 24 and 26 of steam chest 12 are formed so as to accurately resemble the exterior shape of the article to be molded. Steam chest 12 also includes a steam inlet 28 and a steam outlet 30. The innermost inner frame part 32 has a plurality of small pin holes 34 (approximately 0.01–0.001 inches in diameter) formed therein which extends from surface 25 to surface 26 completely through the frame part. A valve network 36 is positioned within steam chest reservoir 20 and includes individual valves 37, 38, 39 communicating with each pin hole 34. Valves 37–39 are interconnected by conduit 40 which also connects the valves to a central control member 42 positioned along outer wall 15 of steam chest 12. Each valve 37–39 is threadably secured to frame part 32 and has a bore 45 which communicates with reservoir 20. Steam chest 14 includes an outer frame plate 44 and an inner frame 46 which form an enclosed steam reservoir 48 as is shown in FIG. 1. The surfaces 50, 52, and 54 are formed so as to accurately resemble the interior of the article to be molded. Steam chest 14 also includes steam inlet port 56 and outlet port 58. As is shown in FIG. 1 with surfaces 60 and 62 of steam chest 14 abutting surfaces 64 and 67 of steam chest 12 a mold cavity is formed between surfaces 26 and 50 of steam chests 12 and 14.

Steam chest 14 is then brought in contact with the steam chest 12 until surfaces 60 and 62 of steam chest 14 abut surfaces 64 and 67 of chest 12. In use, a quantity of expandable polystyrene beads 66 is delivered by injection or other conventional process within the cavity formed by surfaces 22, 24, and 26 of steam chest 12. Steam chests 12 and 14 are then purged with a quantity of steam until surfaces 50 and 26 obtain a predetermined temperature at which time outlets 30 and 58 are closed to retain steam within reservoirs 48 and 20. To expand beads 66 into a homogenized mass a quantity of steam is admitted into the mold cavity by supplying air pressure through control valve 42 at approximately 80 PSI to conduit 40. Valves 37–39 are normally closed and open upon being pressurized and thereby allow steam to pass from steam reservoir 20 through bore 45 and pin holes 34 to the mold cavity. Steam entering the mold cavity causes polystyrene beads 66 to expand and form a homogenized mass which conforms to the inner mold surfaces 50 and 26. Upon a sufficient amount of steam entering the mold chamber, pressure is removed from control valve 42 which causes valves 37 through 39 to close. After sufficient expansion of the polystyrene beads, outlets 58 and 30 are reopened to allow steam trapped within reservoirs 20 and 48 to escape thereby allowing steam chests 12 and 14 to cool. Upon sufficient cooling, steam chests 12 and 14 may be separated and the homogenized mass of polystyrene may be removed from the mold halves.

It is to be understood that while the figures show steam valves 37-39 as being positioned on the lower steam chest 12 it is obvious to one skilled in the art that they may be placed in both steam chests if the mold so requires.

FIG. 2 illustrates a modified valve sysem 36' which includes entry tubes 70, 72 and 74 communicating through pin holes 34 with the mold cavity. Entry tubes 70, 72 and 74 also communicate with a steam manifold 76 which communicates with an air operated pinch valve 78. Pinch valve 78 communicates with an air control unit 42' as shown in FIG. 2 through conduit 80. All other parts of apparatus 10' are identical with those of apparatus 10.

In operation, when it is desired to deliver steam to the mold cavity, the flow of air through control unit 42' is stopped, allowing pinch valve 78 to open and admit steam from chest 12 into manifold 76 and to the mold cavity through entry tubes 70, 72 and 74. When desired, control unit 42' is actuated and delivers air (80 PSI) to pinch valve 78 to close the valve and cut off steam flow to the mold cavity. All other operations are identical to those discussed above.

It is also to be understood that the invention is not limited to the scope of the above given details, but may be modified within the scope of the appended claims.

I claim:

1. Apparatus for forming a molded pattern from expandable materials, said apparatus comprising:
   a mold which has mold walls defining a cavity accurately defining the shape of said pattern and a plurality of heated fluid mold inlets therein communicating with said cavity;
   an enclosed frame means positioned about said mold for storing a quantity of a heated fluid;
   means for introducing said fluid into said enclosed frame means and thereby heat said mold walls;
   valve means positioned completely within said enclosed frame means, said valve means having a valve means inlet within said enclosed frame means, and said valve means coupled with said heated fluid mold inlet for regulating the amount of said heated fluid delivered to said mold cavity from said enclosed frame means, and a single means extending through said enclosed frame means for selectively opening said valve means to deliver said heated fluid to said mold cavity.

2. An apparatus of claim 1 wherein said valve means is a normally closed valve means and said valve selectively opening means is an air pump in communication with said valve means wherein activation of said air pump opens said valve means to introduce said heated fluid into said mold cavity from said enclosed frame means.

3. An apparatus of claim 1, wherein said valve means is a normally open valve means and said valve selectively opening means selectively closes said valve means wherein fluid flow to said mold cavity from said enclosed frame means is ceased.

4. An apparatus of claim 1, further comprising:
   a manifold disposed in said enclosed frame means and coupled to said heated fluid mold inlets, said manifold generally spaced from said mold walls and said valve means inlet providing an inlet for said manifold.

5. An apparatus of claim 1, further comprising:
   common control means for selectively controlling the flow of heated fluid from said enclosed frame means to said mold inlets, said common control means disposed generally away from said mold walls.

6. An apparatus of claim 5, wherein said common control means includes separate valve means for each said mold inlet and for selectively opening and closing said mold inlets, and common actuation means for selectively simultaneously actuating said valve means to shift between open and closed conditions.

7. An apparatus of claim 6, wherein said valve means are pressure actuated valves, and said common actuation means includes a pressurized fluid supply conduit coupled to said valves and a pressure control valve on said pressurized fluid supply conduit.

8. An apparatus of claim 5, wherein said common control means includes a manifold coupled to said mold inlets and having a manifold inlet disposed in said enclosed frame means, and valve means on said manifold for selectively opening and closing said manifold inlet.

* * * * *